B. JEZOWSKI.
BELT SHIFTER.
APPLICATION FILED MAR. 21, 1917.
1,260,677.
Patented Mar. 26, 1918.
2 SHEETS—SHEET 1.
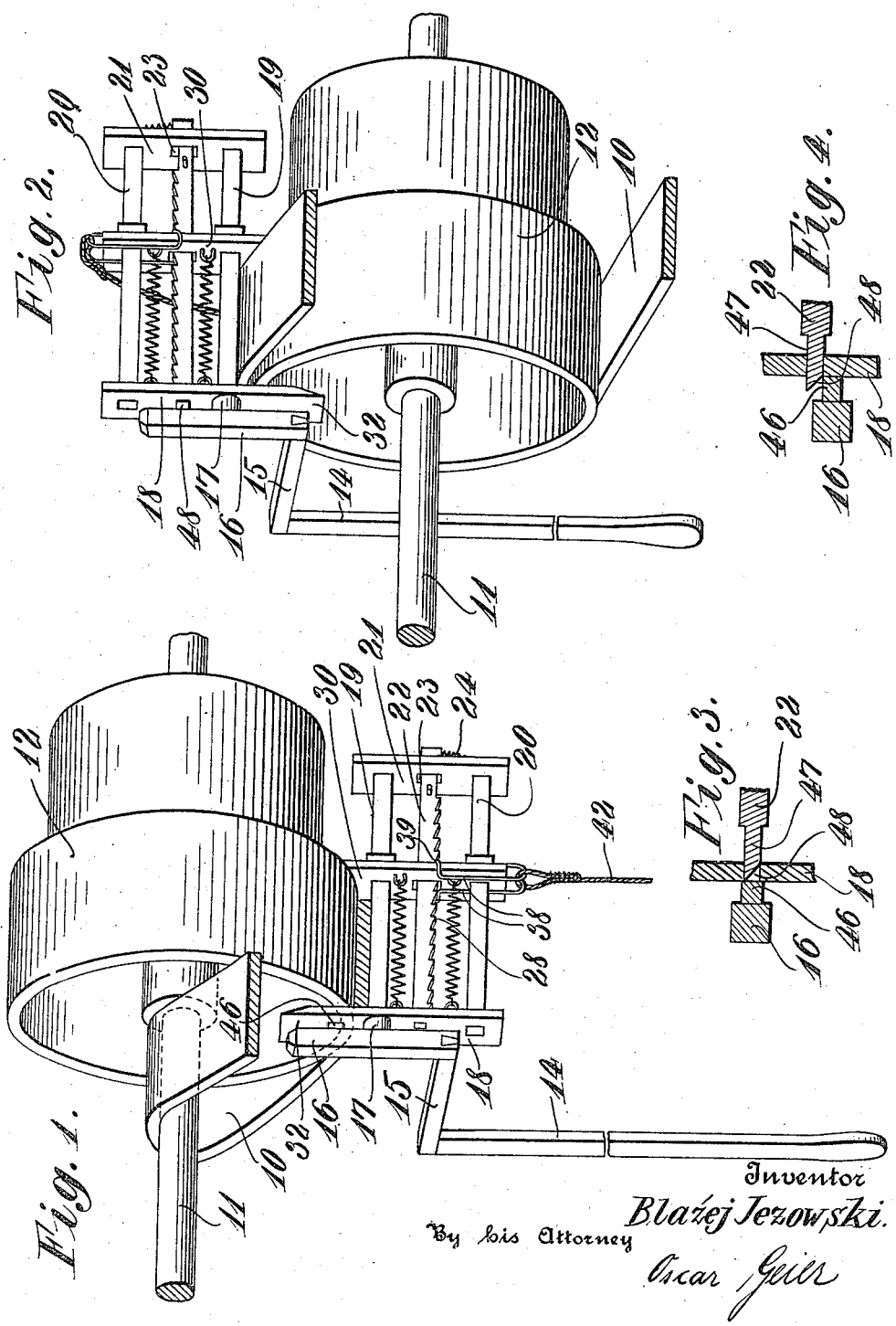
Inventor
Blażej Jezowski.
By his Attorney
Oscar Geier B. JEZOWSKI.
BELT SHIFTER.
APPLICATION FILED MAR. 21, 1917.
1,260,677.
Patented Mar. 26, 1918.
2 SHEETS—SHEET 2.
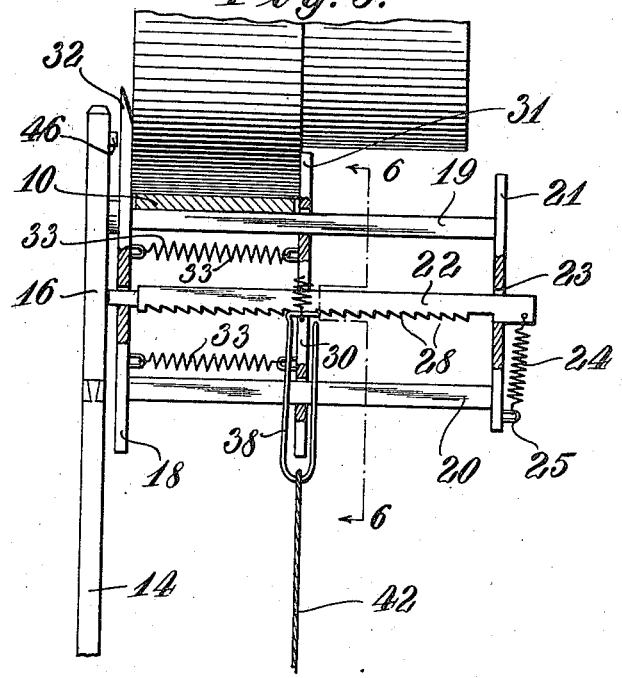
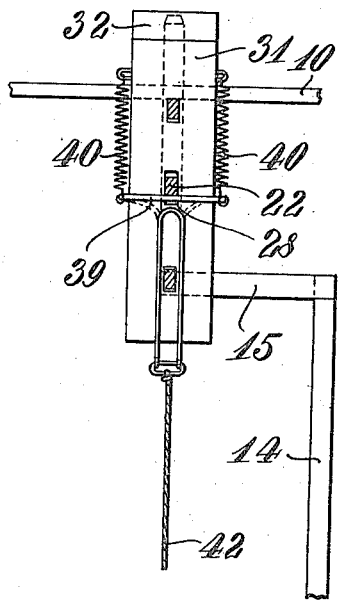
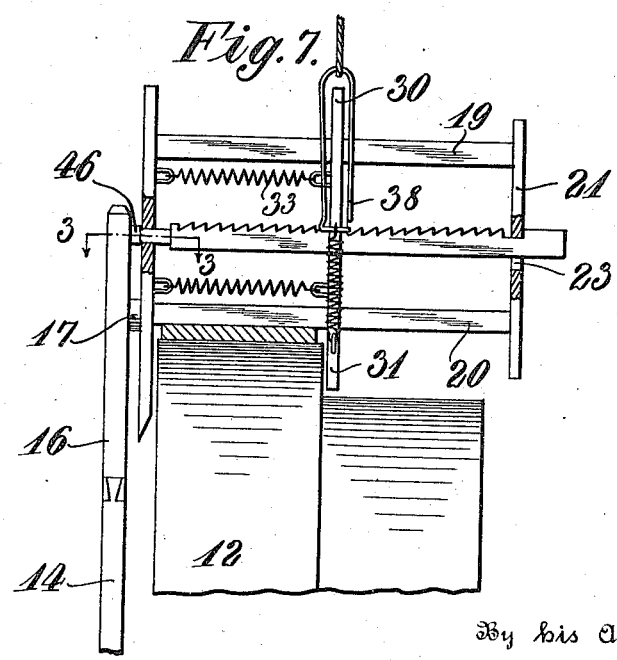
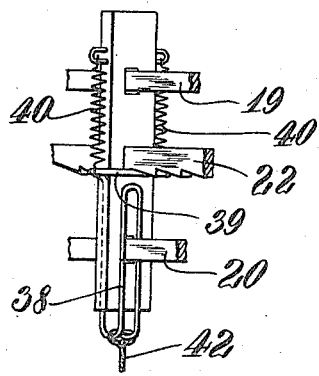
Inventor
Błażej Jezowski.
By his Attorney
Oscar Geier

UNITED STATES PATENT OFFICE.

BLAZEJ JEZOWSKI, OF NEW YORK MILLS, NEW YORK.

BELT-SHIFTER.

1,260,677.
Specification of Letters Patent.
Patented Mar. 26, 1918.

Application filed March 21, 1917. Serial No. 156,355.

*To all whom it may concern:*

Be it known that I, BLAZEJ JEZOWSKI, a subject of the Emperor of Austria, resident of New York Mills, county of Oneida, and State of New York, have invented certain new and useful Improvements in Belt-Shifters, of which the following is a specification.

This invention relates to improvements in belt shifting devices, and particularly to types adapted to conduct a running belt from a shaft to a pulley.

The principal object of the invention is to provide means which are readily manipulated from the floor by an operator, eliminating the danger and risk of direct manual contact of the belt by the hands.

Another object is to provide an apparatus which will operate with equal effect upon belts of various widths, and finally, to provide such apparatus in forms which are relatively cheap in construction, efficient in operation, and comprised of few and simple parts.

These and other like objects are attained by the novel construction and combination of parts hereafter described and shown in the accompanying drawings, forming a material part of this specification, and in which:—

Figure 1 is a perspective view illustrating the application of the implement in its initial position.

Fig. 2 is a similar view of the same, the parts being in an advanced or final position.

Fig. 3 is a fragmental sectional view taken on line 3—3 of Fig. 7.

Fig. 4 is a similar sectional view taken on the same line but showing the parts in another position.

Fig. 5 is a front elevational view showing the parts in engagement with a belt.

Fig. 6 is a sectional view taken on line 6—6 of Fig. 5.

Fig. 7 is a view similar to that shown in Fig. 5 but in another position, and

Fig. 8 is a fragmental perspective view of operative parts.

In the drawings, the implement is shown as engaged with the belt 10, loosely suspended at one end by a shaft 11 on which is secured a cone pulley 12 upon which it may be desired to apply the belt in order to convey rotary motion to or from the shaft.

The implement comprises a handle bar 14 of any desired length, and of such shape as to be readily manipulated by an operator standing upon the floor at some distance below the belt to be shifted.

The upper end of the handle bar or pole 14 has engaged with it an offset arm 15, the outer end of which is rigidly affixed to a bar 16, arranged parallel with and above the handle bar or pole 14, and having a pivot extension 17 by which is engaged a plate 18, in which are rigidly set two extending arms 19 and 20, normally respectively upper and lower, the arms being secured at their outer ends by a similar plate 21.

Also loosely engaged in the plate 18 is a rack-bar 22, the outer end of which extends through a slotted opening 23 formed in the plate 21, and is held normally downward by means of the pull spring 24 attached at one end to the bar 22, and with a fixed eye 25 set in the lower end of the plate 21 at the other, the bar 22 having formed on its lower side a plurality of ratchet shaped teeth 28.

Slidably engaged with the bars 19 and 20 is a plate 30 having an extending upper element 31 oppositely disposed to the beveled end 32 of the plate 18, toward which it is normally drawn by reason of the pull springs 33, arranged in pairs parallel with the arms 19 and 20 in such manner as not to conflict with the belt 10 which is disposed in the open space between the elements 31 and 32 when in operation.

A detent 38 partially surrounds and is slidably engaged with the lower portion of the plate 30, the detent being provided with an element 39 adapted to engage with the teeth 28 of the rack bar 22 and to be normally held in such engagement by reason of the pull springs 40, so as to lock the plate 30 at different distances along the bar 22, thereby providing a suitable space for the belt 10: attached to the lower loop of the detent 38 is a pull cord 42 for releasing the same from engagement with the rack when desired.

Secured rigidly to the inner side of the bar 16 is a projection 46, the same corresponding in length with the extending pivot 17 terminating just short of the plate 18 and at such distance from the pivotal axis of the extension as to register with the rack bar 22 when the position of the latter is reversed.

The end 47 of the rack bar extending through the plate 18 is formed with a beveled point 48 adapted to engage with the projection 46, causing the rack bar and plate 30 to move away from the plate 18 when it has been rotated half way around by reason of contact with the edges of the pulley or belt, releasing the device therefrom.

In operation, when it is desired to shift the belt, the implement is applied in the manner indicated in Fig. 1, the plate or jaw 31 being set at a proper distance from the fixed jaw 32 so as to loosely contain the belt therebetween, it being understood that the application is made to the lower part of the belt running toward the cone, and which is to be shifted from the shaft upon it.

When this adjustment has been made and the implement has been brought closely adjacent to the pulley, the cord is pulled, releasing the detent, whereupon the springs 33 tend to draw the sliding jaw 31 toward the fixed jaw 32 engaging the belt and causing it to move over upon the face of the adjacent pulley.

When the implement attains a reversed position it is automatically detached by the sliding rack bar and returns by gravity to its original position.

Having thus described my invention, what I claim as new, and desire to secure by Letters Patent, is:—

1. In an implement of the class described, the combination with a support rod, a pair of jaws pivotally engaged therewith, one of said jaws being movable relative to the other, means for normally constraining said movable jaw toward said fixed jaw, means for holding said movable jaw extended, and means for releasing said movable jaw.

2. In a belt shifter, the combination with a support pole, a pair of jaws pivotally engaged therewith, a frame upon which one of said jaws is slidable, means for pressing said slidable jaw toward the fixed jaw, a toothed rack engaged with said frame and said fixed jaw, a detent carried by said slidable jaw engageable with the teeth of said rack, means for holding said detent normally in engagement, and means for releasing said holding means, whereby said slidable jaw is carried toward said fixed jaw.

3. A belt shifter comprising a manually operated handle, an offset arm engaged therewith, a frame pivoted to said offset arm, a jaw slidable on said frame, means for normally drawing said slidable jaw toward one end of said frame, means for holding said jaw extended at a predetermined distance, and means for releasing said holding means.

In testimony whereof I have affixed my signature this 18th day of November, 1916.

BLAZEJ JEZOWSKI.

Copies of this patent may be obtained for five cents each, by addressing the "Commissioner of Patents, Washington, D. C."